Oct. 25, 1966  R. W. SEXTON ETAL  3,280,984
FILTER PAD AND SUPPORT MEANS THEREFOR
Filed June 15, 1964
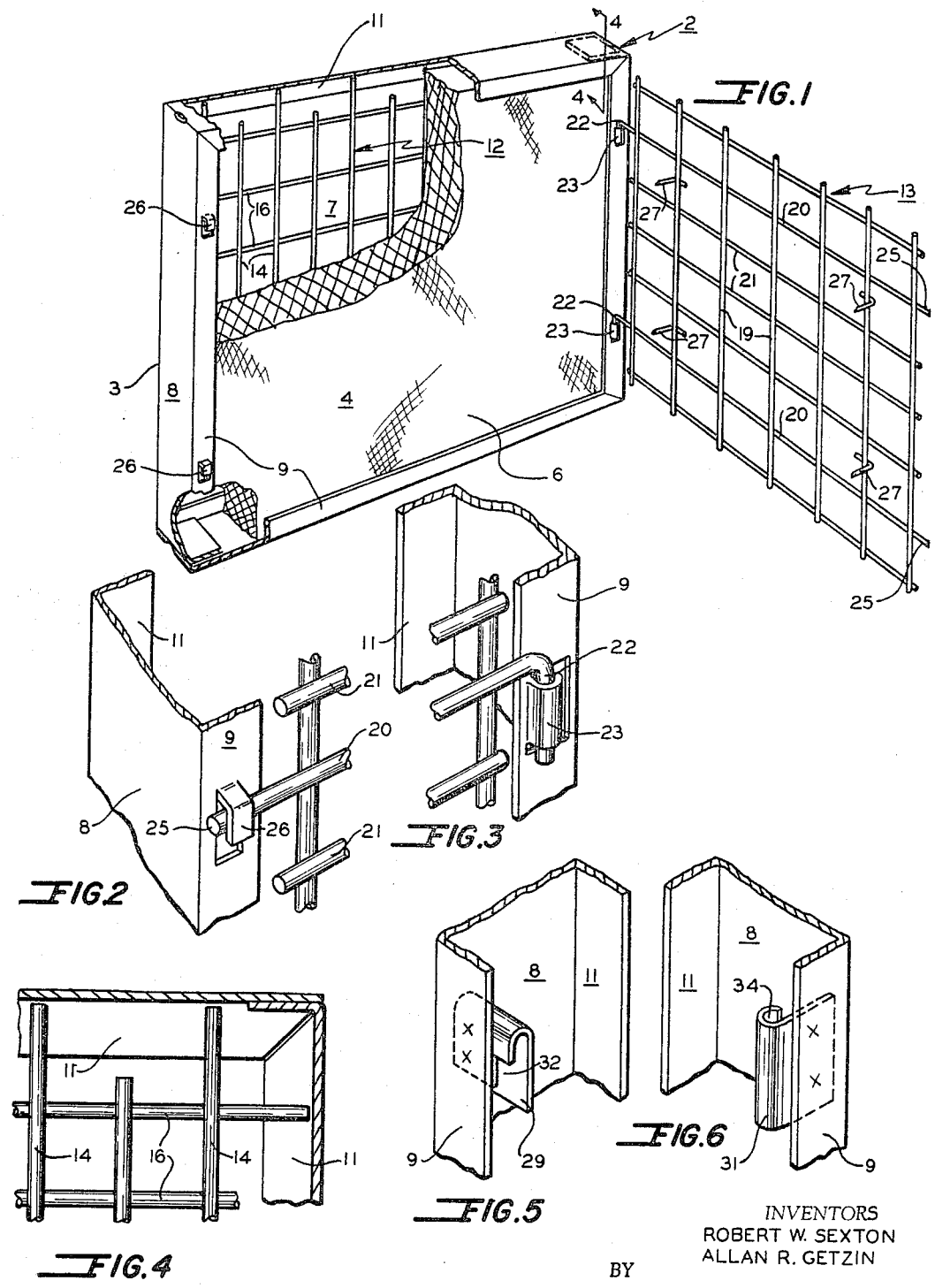
INVENTORS
ROBERT W. SEXTON
ALLAN R. GETZIN
BY
Ralph B. Brick
ATTORNEY United States Patent Office 3,280,984
Patented Oct. 25, 1966

3,280,984
FILTER PAD AND SUPPORT MEANS THEREFOR
Robert W. Sexton, Louisville, and Allan R. Getzin, Jeffersontown, Ky., assignors to American Air Filter Company, Inc., Louisville, Ky., a corporation of Delaware
Filed June 15, 1964, Ser. No. 375,267
1 Claim. (Cl. 210—485)

The present invention relates to improved filter structure and more particularly to an improved arrangement for mounting filter pads in a support frame.

In accordance with the present invention a novel filter structure assembly is provided which recognizes the value of and utilizes the broad principle of sprung-type closures to facilitate rapid and efficient installation and removal of filter medium pads in a support frame with a minimum of manipulative steps. Further, the present invention provides filter structure which can be efficiently and economically produced in mass quantities with a minimum of operation and materials and which can be readily assembled and disassembled for shipping, installation and replacement purposes.

Various other features of the present invention will become obvious to one skilled in the art upon reading the disclosures set forth hereinafter.

More particularly, the present invention provides a filter assembly for filtering contaminant particles from a fluid stream comprising: an open-ended frame defining a path for the fluid stream to be treated including an upstream dirty fluid inlet and a downstream clean fluid outlet; a filter member disposed in the open-ended frame to extend transverse the fluid stream to be treated; a fluid pervious retaining panel comprised of a flexible wire grid member having wire portions thereof turned at their extremities to form pintle means along one side of the panel; hinge means fixed along one side of the frame to receive the pintle means for pivotal and axially resilient mounting of the retaining panel about the hinge means; and open-ended keeper means fixed to the opposite side of the frame to receive and retain wire portions of the grid panel in nesting engagement therewith when the panel is flexed axially along its hinge mounted pintle means, thereby maintaining the panel in closed position.

It is to be understood that various changes can be made in the arrangement, form, and construction of the apparatus disclosed herein by one skilled in the art without departing from the scope or spirit of the present invention. In this connection, it is to be understood that, although the present invention finds particular adaptability with filters of a type utilized for treating gas streams, it can be readily employed with filters for treating other fluids.

Referring to the drawing which discloses one advantageous embodiment of the present invention:

FIGURE 1 is a partially broken-away perspective view of a unit filter assembly incorporating features of the present invention;

FIGURE 2 is an enlarged perspective view of one of the open-ended keepers of FIGURE 1;

FIGURE 3 is an enlarged perspective view of one of the looped hinges of FIGURE 1;

FIGURE 4 is a vertical section view of the frame of FIGURE 1 taken in a plane passing through line 4—4 of FIGURE 1 and looking in the direction of the arrows of such line;

FIGURE 5 is an enlarged perspective view of a modified open-ended keeper which can be utilized with a frame similar to that of FIGURE 1; and FIGURE 6 is an enlarged perspective view of a modified looped hinge which can be used with a frame similar to that of FIGURE 1.

As can be seen in the drawing, the invention filter assembly 2 for filtering contaminant particles from a fluid stream is disclosed as including open-ended filter medium support frame 3 having disposed therein a flat pad of filter medium 4. It is to be understood that support frame 3, which is disclosed as rectangular in shape, can be of other geometrical configurations as the occasion warrants. It further is to be understood that, although the features of the present invention are herein disclosed as part of a unit support frame form incorporating a flat filter medium pad, the features of the present invention also can be employed with other types of frame structures which can incorporate other types of filter means.

Frame 3, as disclosed herein, serves to define a fluid flow path which includes dirty fluid stream inlet 6 and clean fluid stream outlet 7. The frame includes rectangular sidewalls 8 and rectangular border flange walls 9 and 11 extending normal and inwardly from walls 8 along the upstream and downstream faces of the filter respectively to define dirty fluid inlet 6 and clean fluid outlet 7, respectively, and to provide channel-like frame structure of U-shaped cross section. It is to be understood that frame 3 can be made from any one of a number of suitable materials known in the art, and advantageously can be made from a thin, rigid metal of preselected gauge.

Extending between sidewalls 8 of frame 3 so that the edges thereof nest in the channel-like cross section of frame 3 is flat filter medium pad 4. Filter medium pad 4 can be formed from any one of a number of known suitable filtering materials and advantageously is of spun and bonded glass fiber material.

To maintain filter medium pad 4 in proper position in frame 3 with the edges of the pad engaged in the U-shaped channel-like portions of the support frame downstream and upstream fluid pervious grid retaining panels 12 and 13, respectively, are provided with the frame. Retaining panel 12 which is fastened along the downstream side of support frame 3 is comprised of crossed and fastened grid forming sets 14 and 16 of parallel spaced wires. In the disclosed embodiment, the wires of set 14 are arranged to extend vertically and the wires of set 16 are crossed and fastened by some suitable means, such as spot welding, to the wires of set 14, the wires of set 16 extending in a horizontal position normal to wires 14. It is to be noted that the extremities of alternate wires of sets 14 and 16 are fastened by some suitable means, such as spot welding, to the downstream border flange 11 which defines the clean fluid outlet. It is to be understood that, if desired, other arrangements for fastening the wires of grid panel 12 to flange 11 also can be used.

Provided along upstream inlet side of support frame 3 so as to be pivotally mounted relative one side of border flange 9 in the manner described hereinafter is upstream retaining panel 13. Panel 13, in a manner similar to panel 12, is constructed of crossed and fastened sets 19 and 21 of parallel spaced wires, set 19 extending in a vertical direction and set 21 extending in a horizontal direction normal to set 19 and fastened thereto by some suitable means, such as spot welding.

It is to be noted that set 21 includes a pair of spaced resilient wires 20 which are longer than the other wires of set 21 to permit downward permanent bending of corresponding extremities thereof at a 90-degree angle to form spaced pintles 22 along one side of panel 13. The opposite extremities of wires 20 which extend beyond the other wires of set 21 provide tongues 25 which nestingly engage with open-ended keepers or catches 26 in a manner described hereinafter.

Pintles 22 serve to engage with suitably spaced hinges 23 in border flange wall 9. As disclosed in FIGURE 1, hinges 23 can be struck from one side of the border flange wall 9 by a suitable machine-stamping operation. The hinges 23 are looped so as to receive pintles 22 in a male-female engagement, facilitating ready and simple pivotal mounting of panel 13 along the upstream face of frame 3.

To retain panel 13 in closed position, the opposite side of border flange 9 is provided with downwardly-turned open-ended keepers or catches 26. Keepers 26, like hinges 23, also can be struck from border flange wall 9 by a suitable machine-stamping operation. The keepers 26 are then formed as right-angle arms extending outwardly from flange 9 to receive tongues 25 of wires 20 in nesting engagement therewith to maintain panel 13 in closed position. It is to be noted that wires 20 are of sufficiently resilient material to permit springing thereof and that spaced downwardly-extending open-ended keepers 26 are positioned opposite to and in alignment with spaced hinges 23 in which pintles 22 are mounted. This arrangement permits the resilient flexing or springing of wires 20 axially along pintle ends 22 so that tongues 25 at the opposite extremities of wires 20 can be passed around the ends of keepers 26 to spring back into nesting engagement therewith. It also is to be noted that certain of the wires of grid panel 13 can be provided with spikes 27 which engage with filter medium pad 4 to hold the same firmly in position when panel 13 is closed.

As can be seen in FIGURES 5 and 6 of the drawing, a modified keeper and hinge arrangement can be provided including a separately formed keeper 29 and a separately formed hinge 31. The keeper 29, which can be fastened to the inside wall of the border frame flange 9 by some suitable means, such as spot welding, is provided with a downwardly looped section which can be partially cut away as at 32 to permit insertion of tongue 25. The hinge 31 can be fastened in a like manner, such as by spot welding, to the opposite side of flange 9 and is inwardly turned as at 34 to provide a loop to permit male-female engagement of pintle 22 of panel member 13.

Thus, from the above description, it can be seen that a unique filter structure assembly is provided which permits ready installation and removal of a filter medium pad 4 in support frame 3 with a minimum of manipulative steps, it being necessary only to resiliently spring panel member 13 along the axes of pintles 22 engaged in the hinges 23 so that the tongues 25 clear the lower ends of open-ended keepers 26 to resiliently nest in engagement therewith, holding panel 13 in closed position. It further is to be noted that mounting of panel 13 can be accomplished in a very simple matter by merely aligning pintles 22 with hinges 23 and pushing downwardly. In like fashion, it only is necessary to push upwardly on the entire grid panel 13 to remove the panel from frame structure 3.

The invention claimed is:

A filter assembly for filtering contaminant particles from a fluid stream comprising: an open-ended metallic frame defining a path for said fluid stream to be treated, said frame being of channel-like U-shaped cross section to include side walls and spaced parallel inwardly turned border flanges extending normal from said side walls to define an upstream dirty fluid inlet and a downstream clean fluid outlet; a filter member disposed in said open-ended frame to extend transverse the fluid stream to be treated with its edges nesting in the channel-like portions of said frame; a first fluid pervious retaining panel comprised of crossed and fastened grid forming sets of parallel spaced wires with extremities thereof fastened to the downstream border flange defining said clean fluid outlet; a second fluid pervious retaining panel comprised of crossed and fastened grid forming sets of parallel spaced wires with one of said sets including a pair of spaced flexible resilient wires having corresponding extremities thereof turned downwardly in a corresponding direction at a substantially 90-degree angle to form spaced downwardly extending pintles along one side of said panel; a pair of spaced hinge members in the form of loops struck from one side of said upstream border flange to receive said spaced pintles for pivotal and readily removable mounting of said retaining panel; and a pair of open-ended downwardly-extending keepers struck from the opposite side of said upstream border flange and aligned with said hinges to provide openings aligned with the pivotal points of said pintles to receive and to retain opposite tongue extremities of said pair of spaced wires having said pintles in nesting engagement therewith when said panel is resiliently flexed along the axes of its hinge mounted pintles, thereby maintaining said panel in firm closed position.

References Cited by the Examiner

UNITED STATES PATENTS

| 2,266,854 | 12/1941 | Davis. | |
|---|---|---|---|
| 2,408,158 | 9/1946 | Belsher | 55—491 |
| 3,087,459 | 4/1963 | Dirck | 119—17 |
| 3,150,945 | 9/1964 | Baggeson | 55—493 |

ROBERT F. BURNETT, *Primary Examiner.*